(12) United States Patent
Hamann et al.

(10) Patent No.: US 11,861,780 B2
(45) Date of Patent: Jan. 2, 2024

(54) POINT CLOUD DATA MANAGEMENT USING KEY VALUE PAIRS FOR CLASS BASED RASTERIZED LAYERS

(71) Applicant: International Business Machines Corporation, Armonk, NY (US)

(72) Inventors: Hendrik F. Hamann, Yorktown Heights, NY (US); Carlo Siebenschuh, White Plains, NY (US); Siyuan Lu, Belmont, CA (US); Conrad M. Albrecht, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 17/455,371

(22) Filed: Nov. 17, 2021

(65) Prior Publication Data
US 2023/0154098 A1 May 18, 2023

(51) Int. Cl.
G06T 15/00 (2011.01)
G06F 16/583 (2019.01)
G06F 16/55 (2019.01)
G06F 16/51 (2019.01)

(52) U.S. Cl.
CPC .............. G06T 15/00 (2013.01); G06F 16/51 (2019.01); G06F 16/55 (2019.01); G06F 16/583 (2019.01)

(58) Field of Classification Search
CPC ....... G06T 17/005; G06T 15/00; G06F 16/51; G06F 16/55; G06F 16/583
See application file for complete search history.

(56) References Cited

U.S. PATENT DOCUMENTS

| 7,804,498 | B1 | 9/2010 | Graham et al. | |
| 9,530,225 | B1 | 12/2016 | Nieves | |
| 2016/0335288 | A1* | 11/2016 | Qiu | G06F 16/178 |
| 2018/0373771 | A1* | 12/2018 | Ashwood-Smith | G06F 12/06 |
| 2019/0145776 | A1* | 5/2019 | Yang | G01C 21/005 |
| | | | | 702/150 |
| 2020/0273078 | A1* | 8/2020 | Xu | G06Q 30/04 |
| 2020/0286282 | A1* | 9/2020 | Grant | G06V 20/647 |
| 2021/0018608 | A1* | 1/2021 | Charpentier | G01S 13/887 |
| 2021/0200218 | A1 | 7/2021 | Albrecht et al. | |
| 2021/0201129 | A1 | 7/2021 | Schmude et al. | |

(Continued)

OTHER PUBLICATIONS

El-Ashmawy et al., "Raster vs. Point Cloud Lidar Data Classification," The International Archives of the Photogrammetry, Remote Sensing and Spatial Information Sciences, vol. XL-7, 2014ISPRS Technical Commission VII Symposium, Sep. 29-Oct. 2, 2014, Istanbul, Turkey, 5 pages.

(Continued)

*Primary Examiner* — Phi Hoang
(74) *Attorney, Agent, or Firm* — Yee & Associates, P.C.

(57) ABSTRACT

A computer implemented method rasterizes point cloud data. A number of processor units rasterizes the point cloud data into rasterized layers based on classes in which each rasterized layer in the rasterized layers corresponds to a class in the classes. The number of processor units creates key value pairs from the rasterized layers. The number of processor units store the key value pairs in a key value store. According to other illustrative embodiments, a computer system and a computer program product for rasterizing point cloud data are provided.

17 Claims, 9 Drawing Sheets

(56) References Cited

U.S. PATENT DOCUMENTS

2021/0400103 A1* 12/2021 Hur .................... H04L 67/10
2022/0035741 A1* 2/2022 Ray .................... G06F 12/0813
2022/0116475 A1* 4/2022 Boshev ................ G06F 9/545

OTHER PUBLICATIONS

Giotte et al., "Attribute Filtering of Urban Point Clouds Using Max-Tree on Voxel Data," LNCS 11564, 2019, 12 pages.
Luo et al., "Visual Analysis of Large-scale LiDAR Point Clouds," 2015 IEEE International Conference on Big Data (Big Data), 6 pages.
Politz et al., "Geometry-Based Point Cloud Classification Using Height Distributions," ISPRS Annals of the Photogrammetry, Remote Sensing and Spatial Information Sciences, vol. V-2-2020, 2020 XXIV ISPRS Congress (2020 edition), 8 pages.
Richardt et al., "Capture, Reconstruction, and Representation of the Visual RealWorld for Virtual Reality," In Real VR—Immersive Digital Reality, Lecture Notes in Computer Science, vol. 11900. pp. 3-32. 2020.

\* cited by examiner

POINT CLOUD DATA MANAGEMENT USING KEY VALUE PAIRS FOR CLASS BASED RASTERIZED LAYERS

BACKGROUND

1. Field

The disclosure relates generally to an improved computer system and more specifically to a method, apparatus, computer system, and computer program product for rasterizing point cloud data.

2. Description of the Related Art

A point cloud comprises huge amounts of data points in three dimensions and can be represented using x, y, and z coordinates. These data points can represent a three-dimensional shape or object. Point clouds can be produced using three-dimensional scanners, such as light detection and ranging (LIDAR) lasers or sonar systems. Point clouds can also be generated using photogrammetry.

Point clouds can be used to create terrain elevation models. Point clouds can also be generated for use in three dimensional models of urban environments, forests, and other areas. Point cloud databases can be managed and made available to users for use in creating models. For example, the data points in a point cloud can be rendered into three-dimensional matches to build models.

SUMMARY

According to one illustrative embodiment, a computer implemented method is provided for rasterizing point cloud data. A number of processor units rasterizes the point cloud data into rasterized layers based on classes in which each rasterized layer in the rasterized layers corresponds to a class in the classes. The number of processor units creates key value pairs from the rasterized layers. The number of processor units stores the key value pairs in a key value store. According to other illustrative embodiments, a computer system and a computer program product for rasterizing point cloud data are provided.

DETAILED DESCRIPTION

Figure 1:
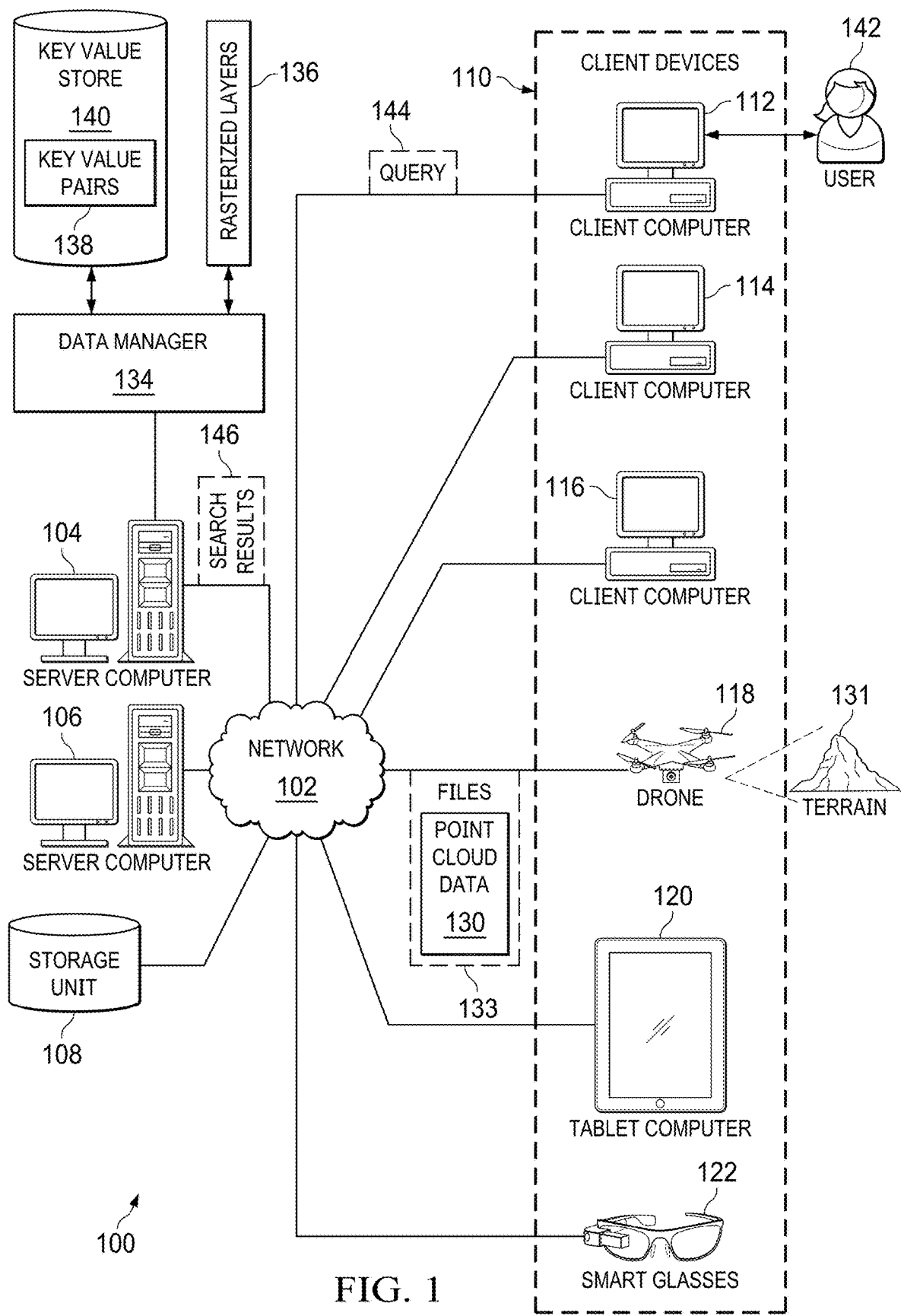
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account the data points in point clouds can be classified. In other words, each point can be assigned a classification. For example, a point in a point cloud can be classified as ground, a building, a road surface, water, wire conductor, a rail, low vegetation, medium vegetation, high vegetation, a cell tower, or other type of point. Storing these point clouds can take more space than desired. For example, files for cloud point data at 132 points per square meter (ppsm) generated for a geographic area of 13.15 square kilometers of rural land can use 52.2 Gb of storage.

The illustrative embodiments recognize and take into account that one manner in which the amount of data can be reduced can be to generate a rasterized layer for each class of data points. The illustrative embodiments recognize and take into account that the resulting files for these rasterized layers can provide space savings over storing the point clouds by themselves. For example, the illustrative embodiments recognize and take into account that converting the point cloud for the geographic area into rasterized layers can result in files that use 32.2 Gb of storage. The illustrative embodiments recognize and take into account that a rasterized layer is an image in which null values are included for pixels in which data points are not present for the particular class represented by the rasterized layer. In other words, empty portions of the image are represented by null values.

The illustrative embodiments recognize and take into account that the amount of space savings may not be as great as desired. Further, the illustrative embodiments also recognize and take into account that further storage savings can be obtained by converting the rasterized layers into key value pairs. The illustrative embodiments recognize and take into account that only key value pairs are stored for the points in the class. As a result, portions of a rasterized layer that do not include data for the class are not stored. For example, the storage of the key value pairs can use 0.59 G of storage space as compared to 32.2 Gb of storage for rasterized layers and 52.2 Gb of storage for a point cloud for the same geographic area.

The illustrative embodiments also recognize and take in account that by converting the rasterized layers into key value pairs for storage, the point cloud data, which is normally difficult to query, can be easily queried when converted into key value pairs. The illustrative embodiments also recognize and take in account that by converting the rasterized layers into key value pairs for storage, the point cloud data can be easily combined with other geospatial layers. As a result, the illustrative embodiments recognize and take account that this conversion can make point cloud data that is unsearchable and difficult to visualize into a form that can be more easily queried.

Thus, the illustrative embodiments provide a method, apparatus, computer system, and computer program product for rasterizing point cloud data and storing the rasterized point cloud data as key value pairs. A computer implemented method rasterizes point cloud data. A number of processor units rasterizes the point cloud data into rasterized layers based on classes in which each rasterized layer in the rasterized layers corresponds to a class in the classes. The number of processor units creates key value pairs from the rasterized layers. The number of processor units store the key value pairs in a key value store. According to other illustrative embodiments, a computer system and a computer program product for rasterizing point cloud data are provided.

As a result, the storage of key value pairs derived from the point cloud data can use less storage. Additionally, the key value pairs can be searched in response to receiving queries.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as drone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, drone 118 having a lidar sensor system can generate point cloud data 130 by scanning terrain 131. Drone 118 can transmit point cloud data 130 in files 133 to data manager 134 in server computer 104. Files 133 can be LAS (laser) files in this example.

As depicted, data manager 134 can process point cloud data 130 received in files 133 on a class-by-class basis to create rasterized layers 136. The classes can be, for example, unclassified, ground, low vegetation, medium vegetation, high vegetation, road, and building. As a result, each rasterized layer in rasterized layers 136 contains information for a class. In creating a rasterization layer, data manager 134 creates a matrix representation of data points for a class in point cloud data 130 in creating a rasterization layer. The creation of rasterized layers 136 reduces the amount of data for storage as compared to point cloud data 130.

Data manager 134 processes rasterized layers 136 created from point cloud data 130 generate key value pairs 138. Key value pairs 138 are stored in key value store 140. The amount of data for key value pairs 138 is less than the amount of data for rasterized layers 136. In this illustrative example, key value pairs 138 are generated only for portions of rasterized layers 136 that contain data. Rasterized layers 136 is a matrix representation in which some cells or entries are empty and represented by null values. In other words, values are absent for some portions because data points are not present for the class corresponding to the rasterization layer. These portions can be considered empty portions in rasterized layers 136.

For example, for a rasterization layer representing the class roads in point cloud data 130, values are not present in the rasterization layer for data points in point cloud data 130 where roads are absent. Instead, null values are used to indicate that no data is present for the roads in those portions of the rasterization layer. In this case, key value pairs 138 are not generated for those empty portions. As a result, the amount of data is further reduced by only generating key value pairs 138 for the portions of the rasterization layer containing roads. Thus, the amount of data needed to be stored in key value store 140 can be greatly reduced as compared to storing point cloud data 130. In this illustrative example, key value store 140 can be a database.

With the storage of key value pairs 138 in key value store 140, point cloud data 130 represented as key value pairs 138 can be searched. For example, user 142 and client computer 112 can send query 144 to data management 134 to search key value store 140. For example, the query can be to return information about buildings having an elevation greater than 50 feet. Data manager 134 searches key value pairs 138 in key value store 140 and returns search result 146 to user 142 and client computer 112. In other illustrative examples, user 142 can take other forms other than a person. In some illustrative examples, a user can be a program or a process running on a computing device.

Figure 2:
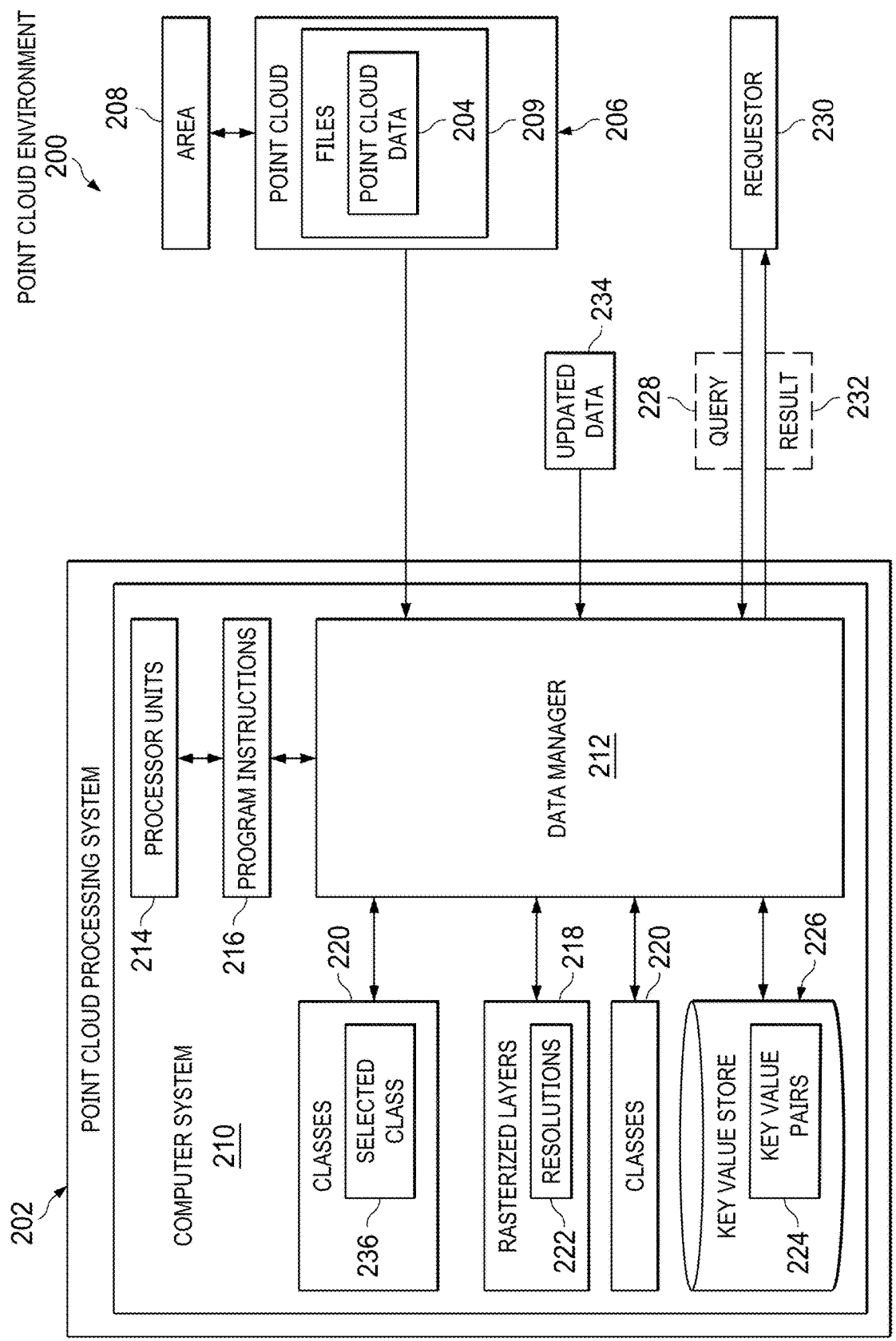
FIG. 2 is a block diagram of a point cloud environment in accordance with an illustrative embodiment.

With reference now to FIG. 2, a block diagram of a point cloud environment is depicted in accordance with an illustrative embodiment. In this illustrative example, point cloud environment 200 includes components that can be implemented in hardware such as the hardware shown in network data processing system 100 in FIG. 1.

In this illustrative example, point cloud processing system 202 in point cloud environment 200 can process point cloud data 204 in point cloud 206 for area 208. In this illustrative example, area 208 is a geographic area. Point cloud data 204 in point cloud 206 can represent information about characteristics of area 208.

Point cloud data 204 can be stored in a set of files 209. Point cloud data 204 and files 209 can be in a number of different formats. For example, the formats can be LAS (laser), FLS (faro), PCD (point cloud data), and other suitable formats for point cloud data 204. As used herein, a "set of" when used with reference to items means one or more items. For example, a set of files 209 is one or more of files 209.

As depicted, point cloud processing system 202 comprises computer system 210 and data manager 212. Data manager 212 is located in computer system 210.

Data manager 212 can be implemented in software, hardware, firmware or a combination thereof. When software is used, the operations performed by data manager 212 can be implemented in program instructions configured to run on hardware, such as a processor unit. When firmware is used, the operations performed by data manager 212 can be implemented in program instructions and data and stored in persistent memory to run on a processor unit. When hardware is employed, the hardware can include circuits that operate to perform the operations in data manager 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. When more than one data processing system is present in computer system 210, those data processing systems are in communication with each other using a communications medium. The communications medium can be a network. The data processing systems can be selected from at least one of a computer, a server computer, a tablet computer, or some other suitable data processing system.

As depicted, computer system 210 includes a number of processor units 214 that are capable of executing program instructions 216 implementing processes in the illustrative examples. As used herein, a processor unit in the number of processor units 214 is a hardware device and is comprised of hardware circuits such as those on an integrated circuit that respond and process instructions and program code that operate a computer. When a number of processor units 214 execute program instructions 216 for a process, the number of processor units 214 is one or more processor units that can be on the same computer or on different computers. In other words, the process can be distributed between processor units on the same or different computers in a computer system. Further, the number of processor units 214 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

As depicted, data manager 212 can provide a process for rasterizing point cloud data 204. In one illustrative example, data manager 212 rasterizes point cloud data 204 into rasterized layers 218 based on classes 220. Each rasterized layer in rasterized layers 218 corresponds to a class in classes 220. A rasterized layer in rasterized layers 218 can be stored as an image comprising a matrix of pixels.

In this illustrative example, in rasterizing point cloud data 204, data manager 212 identifies a set of files 209 containing point cloud data 204. Data manager 212 rasterize is point cloud data 204 in each file in the set of files 209 into a set of rasterized layers 218 in rasterized layers 218 based on classes 220 for point cloud data 204 in which each rasterized layer in rasterized layers 218 corresponds to a class in classes 220. In other words, responsive to point cloud data 204 in a file in the set of files 209 having more than one class, the rasterization of that file results in more than one rasterization layer in which each rasterization layer corresponds to a class in classes 220.

Further, a class in classes 220 can have more than one rasterized layer in rasterized layers 218 when the rasterization is performed on the set of files 209. For example, two files in the set of files 209 can have point cloud data 204 of the same class in classes 220. The rasterization of these two files results in two rasterized layers 218 being created for that class.

In another illustrative example, the set of files can be combined into a single grouping of point cloud data 204 for rasterization. In this example, each class in classes 220 can have a single rasterization layer in rasterized layers 218.

Further, rasterized layers 218 have resolutions 222. In one illustrative example, resolutions 222 can be different for different rasterized layers in rasterized layers 218. In other words, resolutions 222 can be multiple resolutions. As a result, point cloud data 204 of different classes in classes 220 can be stored at different resolutions. For example, street signs can be stored at a higher resolution as compared to a body of water.

Data manager 212 creates key value pairs 224 from rasterized layers 218; data manager 212 stores key values pairs 224 in key value store 226. In this illustrative example, the creation of key value pairs 224 is performed such that only portions of a rasterization layer having data points for that class are used to create key value pairs 224. Other portions of the rasterization layer in which data points are absent for that class will have null values for similar indicators indicating that a particular portion of the rasterization layer does not contain data for the class. As a result, this conversion of rasterized layers 218 into key value pairs 224 can reduce the amount of data stored in key value store 226 as compared to storing rasterized layers 218.

With the storage of key value pairs 224 in key value store 226, this representation of rasterized layers 218 generated from the rasterization point cloud data 204 can also be queried or searched in addition to using less storage space. For example, data manager 212 can receive query 228 from requestor 230. In response to receiving query 228, data manager 212 can search key value pairs 224 in key value store 226 using query 228. Data manager 212 can return result 232 from searching key value pairs 224 in key value store 226 to requestor 230. In this example, data manager 212 can implement database management system processes that enable querying key value pairs 224 and key value store 226.

As a result, the search capability can enable combining data from key value pairs 224 for different rasterized layers in rasterized layers 218 when searching key value pairs 224 to generate result 232. For example, result 232 generated in response to query 228 can include a combination of data from key value pairs 224. These results can be, for example, used to generate a digital training model (DTM), a canopy height model (CHM), a digital surface model (DSM), or other suitable model depending on classes 220.

In this illustrative example, data manager 212 can receive updated data 234 for selected class 236 in classes 220. Data manager 212 can update key value pairs 224 having selected class 236 using updated data 234. In this illustrative example, updated data 234 can take a number of different forms. For example, updated data 234 can be selected from at least one of new point cloud data, a street map, a vegetation index, satellite imagery, satellite data, or data from other sources for area 208. As a result, updated data 234 can enhance key value pairs 224 generated from rasterized layers 218 from rasterization of point cloud data 204 in its original form. Further, this updating can be performed selectively for different classes allowing for increasing the resolution or information for various classes in classes 220 for key pair values 224. For example, the increased resolution can come from using different LIDAR technologies or sensor settings that can increase the resolution for data and key value pairs 224.

Figure 3:
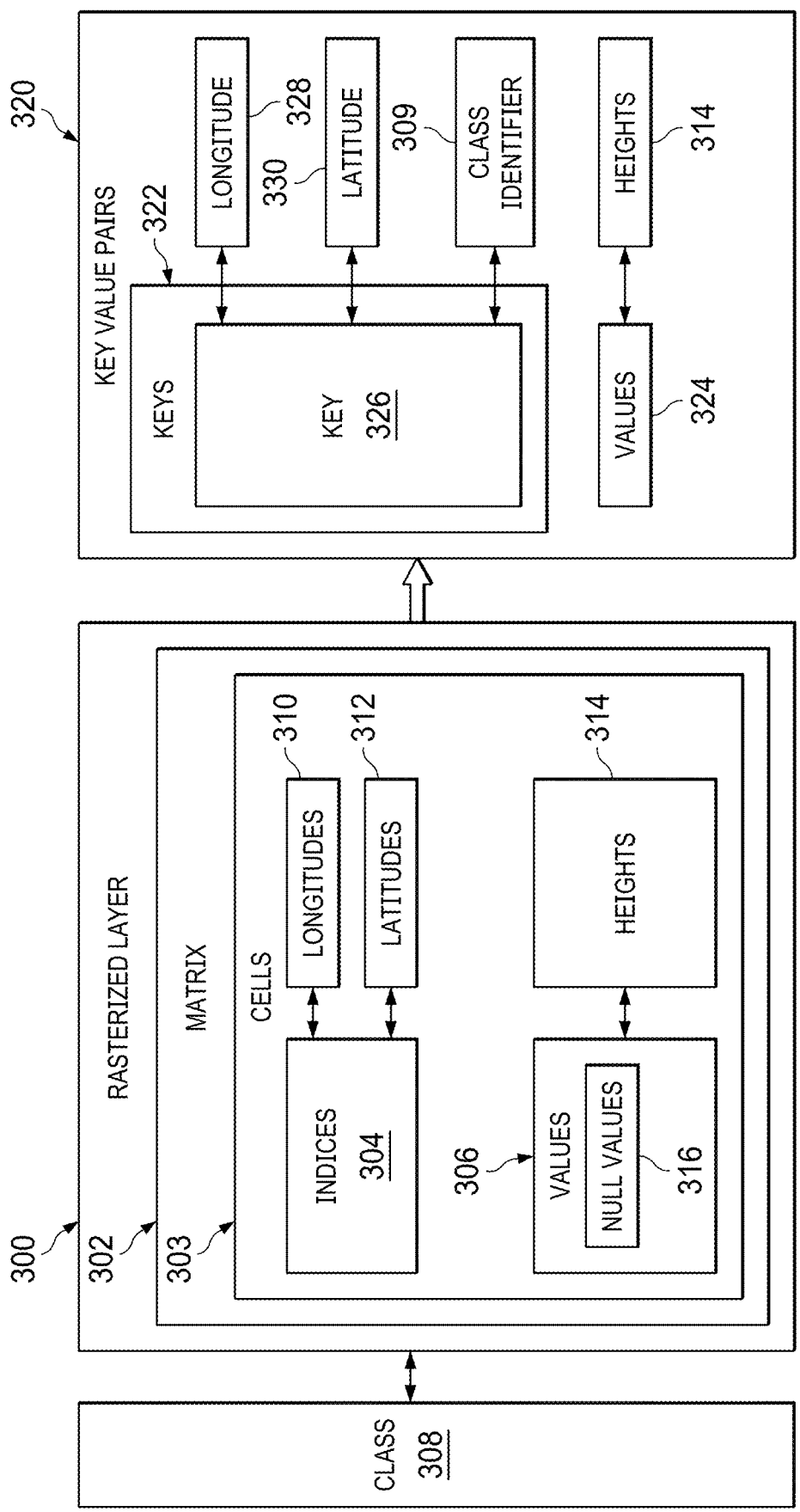
FIG. 3 is an illustration key value pair creation for a rasterized layer in accordance with an illustrative embodiment.

Turning next to FIG. 3, an illustration key value pair creation for a rasterized layer is depicted in accordance with an illustrative embodiment. In this illustrative example, rasterized layer 300 is an example of a rasterized layer in rasterized layers 218 in FIG. 2.

Rasterized layer 300 takes the form of matrix 302 with indices 304 and values 306 for class 308. Matrix 302 comprises cells 303 that can represent data points in a point cloud. These data points from the point cloud are converted to rasters or pixels. In other words, rasterizing involves converting the point cloud data into a matrix representation in matrix 302 in this example.

In this illustrative example, indices 304 comprises longitudes 310 and latitudes 312 for x and y coordinates. Values 306 take the form of heights 314 for z coordinates. Heights 314 can also be referred to as elevations. In this illustrative example, null values 316 are present in values 306 for heights 314 when the particular longitudes and latitudes do not have a value for class 308. For example, if class 308 is a building and the point cloud value at that particular longitude and latitude is for a road or vegetation, the value is a null value indicating that the data point does not represent a building. As a result, matrix 302 can comprise values 306 in the form of heights 314 in which these values include nulls values 316 to indicate that data is not present for class 308.

As depicted, rasterized layer 300 can be converted into key value pairs 320. In this illustrative example, a one-to-one correspondence between values 306 and key value pairs 320 is absent when null values 316 are present in values 306. As result, a given cell in cells 303 converted into a key value pair in matrix 302 is in key value pairs 320 only when a null value in null values 316 is not present for that cell.

In this manner, sparse storage of values 306 can be achieved by storing key value pairs 320 generated from matrix 302. In other words, cells 303 containing null values 316 can be eliminated from conversion into key value pairs 320, resulting in increased efficiency in the amount of data stored. Further, rasterized layer 300 does not have to be stored in a file in storage if sufficient memory is present for processing and converting rasterized layer 300 into key value pairs 320.

In this illustrative example, selection of the matrix size can depend on the point density of the data points in the point cloud. The coordinates of the data points may not precisely match cells 303 in matrix 302. In that case, a nearest neighbor approach or other interpolation approaches can be applied. In case multiple data points per cell are present, the average value of the data points can represent the height and respective class. In the matrix representation most values are empty and can be represented using a null value. If matrix 302 for rasterized layer 300 is stored as a file, the amount of overhead can be great because of the number of empty cells. Although rasterization of point cloud data can be useful, the overhead of empty cells makes this type of class-by-class raster approach less desirable.

As a result, matrix 302 for rasterization layer 300 can be converted into key value pairs. In this illustrative example, key value pairs 320 comprise keys 322 and values 324. Keys 322 and values 324 in key value pairs 320 can take a number of different forms.

For example, key 326 in keys 322 can be longitude 328 and latitude 330. As another example, key 326 can be longitude 328, latitude 330, and class identifier 309. In other words, key 326 does not have to be just longitude 328 and latitude 330. As depicted, values 324 takes the form of heights 314 in this illustrative example.

In one illustrative example, one or more illustrative examples are present that overcome an issue with at least one of storing or searching point cloud data. As a result, one or more illustrative examples can enable reducing the amount of storage needed to store point cloud data and can enable searching point cloud data. In one or more illustrative of examples, the point cloud data is processed to form rasterized layers based on classes. These rasterized layers are converted to key value pairs in which key value pairs orally generated for portions of the rasterized layers that have data and are not empty were represented by null values.

Computer system 210 in FIG. 2 can be configured to perform at least one of the steps, operations, or actions described in the different illustrative examples using software, hardware, firmware or a combination thereof. As a result, computer system 210 operates as a special purpose computer system in which data manager 212 in computer system 210 enables rasterizing data points and point clouds into rasterized layers based on class and further creating key value pairs for the rasterized layers. As a result, the key value pairs 224 can represent point cloud data 204 in point cloud 206. In particular, data manager 212 transforms computer system 210 into a special purpose computer system as compared to currently available general computer systems that do not have data manager 212.

In the illustrative example, the use of data manager 212 in computer system 210 integrates processes into a practical application for method rasterizing point cloud data that increases the performance of computer system 210. In other words, data manager 212 in computer system 210 is directed to a practical application of processes integrated into data manager 212 in computer system 210 that rasterizes the point cloud data into rasterized layers based on classes in which each rasterized layer in the rasterized layers corresponds to a class in the classes; creates key value pairs from the rasterized layers; and stories the key value pairs in a key value store. In this illustrative example, data manager 212 in computer system 210—more steps that results in improvement at least one of reducing storage space needed or enabling searching of the data.

The illustration of point cloud environment 200 in the different components in FIGS. 2-3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, values 306 in rasterized layer 300 and values 324 in key value pairs 320 can take other forms other than heights 314. For example, a value in rasterized layer 300 and in a key value pair in key value pairs 320 can be selected from at least one of a value in the key value pair is selected from at least one of a height, a temperature, a surface moisture, a reflectivity value, or some other value. In other words, the value in a key value pair can include more than one parameter.

Figure 4:
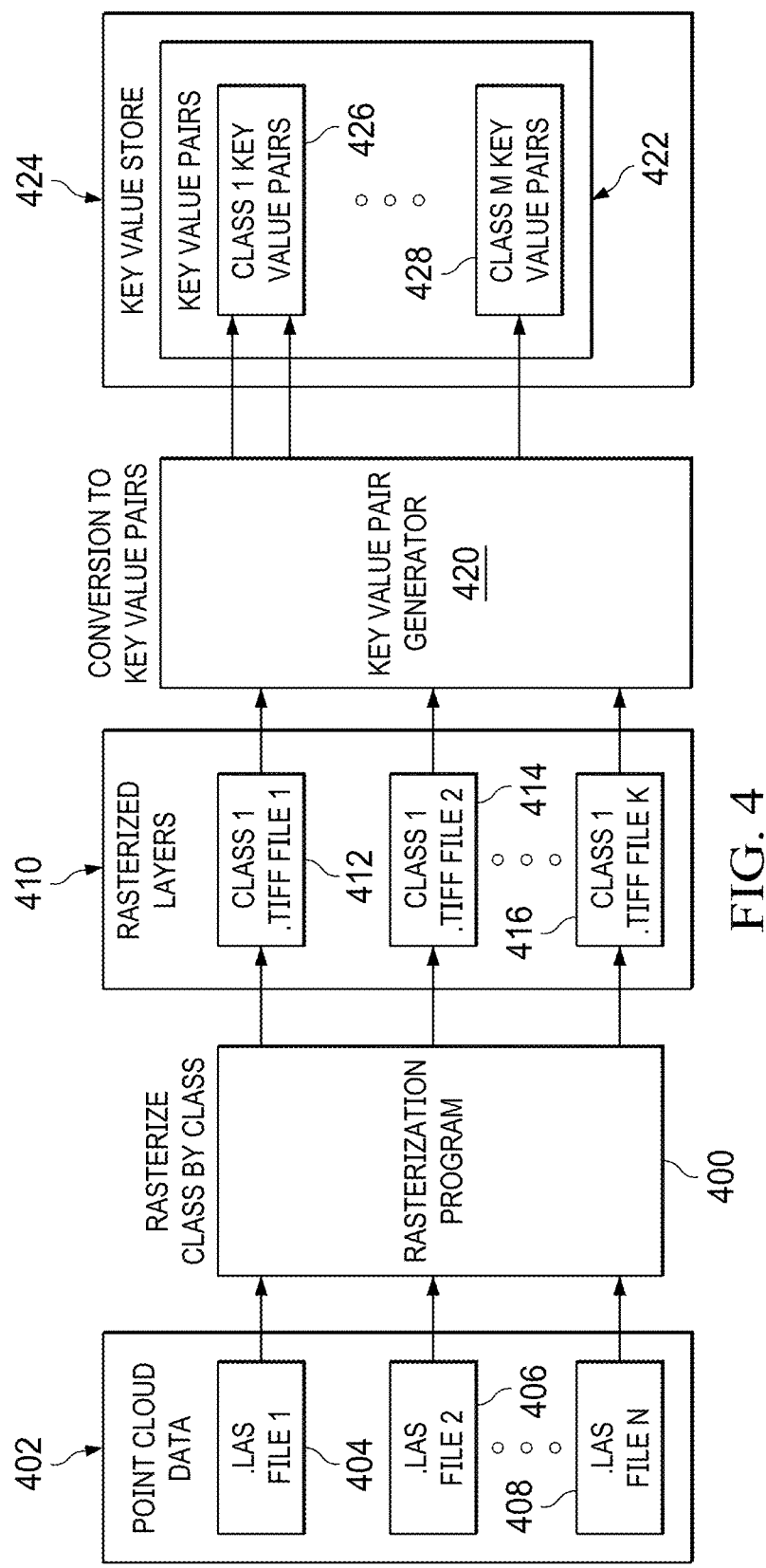
FIG. 4 is a dataflow diagram for processing point cloud data in accordance with an illustrative embodiment.

Turning next to FIG. 4, a dataflow diagram for processing point cloud data is depicted in accordance with an illustrative embodiment. This dataflow can be implemented using point cloud processing system 202 in FIG. 2.

As depicted, rasterization program 400 receives point cloud data 402 in.las file 1 404, .las file 2 406 though.las file N 408. Rasterization program 400 can be implemented in data manager 212 in point cloud processing system 202 in FIG. 2. Rasterization program 400 converts point cloud data 402 in these files into rasterized layers 410.

Rasterization program 400 performs the rasterization on a class by class basis. In other words, rasterization program 400 creates a rasterization layer for each class in the files containing point cloud data 402. In this illustrative example, rasterized layers 410 are located in class 1.tiff file 1 412, class 2.tiff file 2 414, through class m.tiff file k 416. In this depicted example, m classes are present resulting in k files being generated for rasterized layers 410.

Rasterized layers 410 is then converted by key value pair generator 420 into key value pairs 422 and stored in key value store 424. In this illustrative example, key value pairs 422 can be organized in key value store 424 based on classes. For example, class 1 key value pairs 426 through class m key value pairs 428 are present in key value pairs 422. In this illustrative example, m groups of key value pairs 422 are present in which each group of key value pairs 422 is for a particular class from class 1 through class m.

Figure 5:
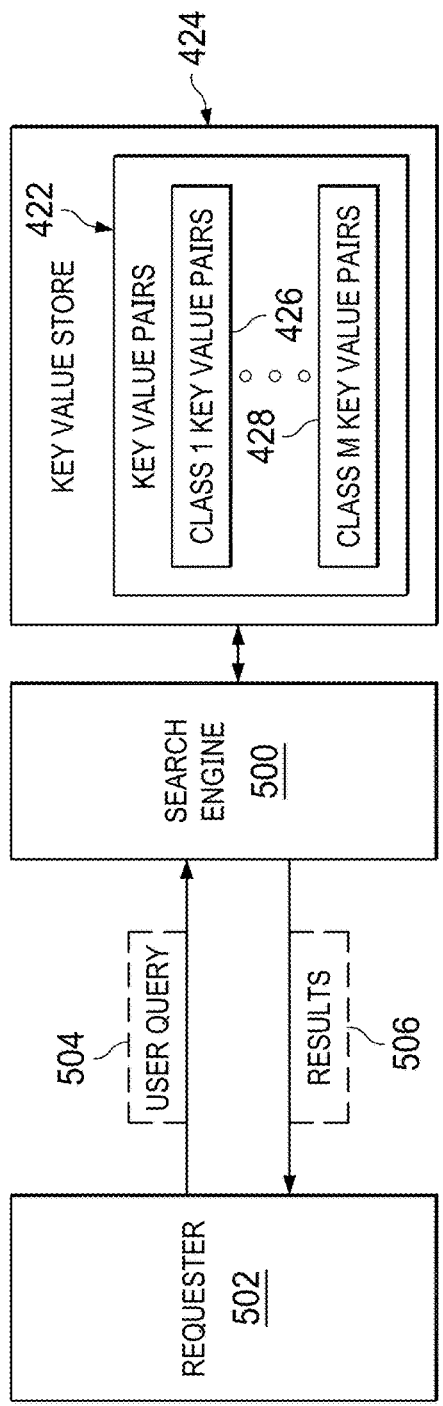
FIG. 5 is a dataflow diagram for querying a key value store in accordance with an illustrative embodiment.

Turning next to FIG. 5, a dataflow diagram for querying a key value store is depicted in accordance with an illustrative embodiment. In the illustrative examples, the same reference numeral may be used in more than one figure. This reuse of a reference numeral in different figures represents the same element in the different figures.

In this illustrative example, key value store 424 generated by the dataflow shown in FIG. 4 can be searched using search engine 500. Search engine 500 can be implemented in data manager 212 in FIG. 2.

As depicted, requester 502 extends user query 504 to search engine 500. User query 504 can be used by search engine 500 to search key value pairs 422 in key value store 424. The search can identify results 506 from key value pairs 422 in key value store 424, which are returned to requester 502.

Figure 6:
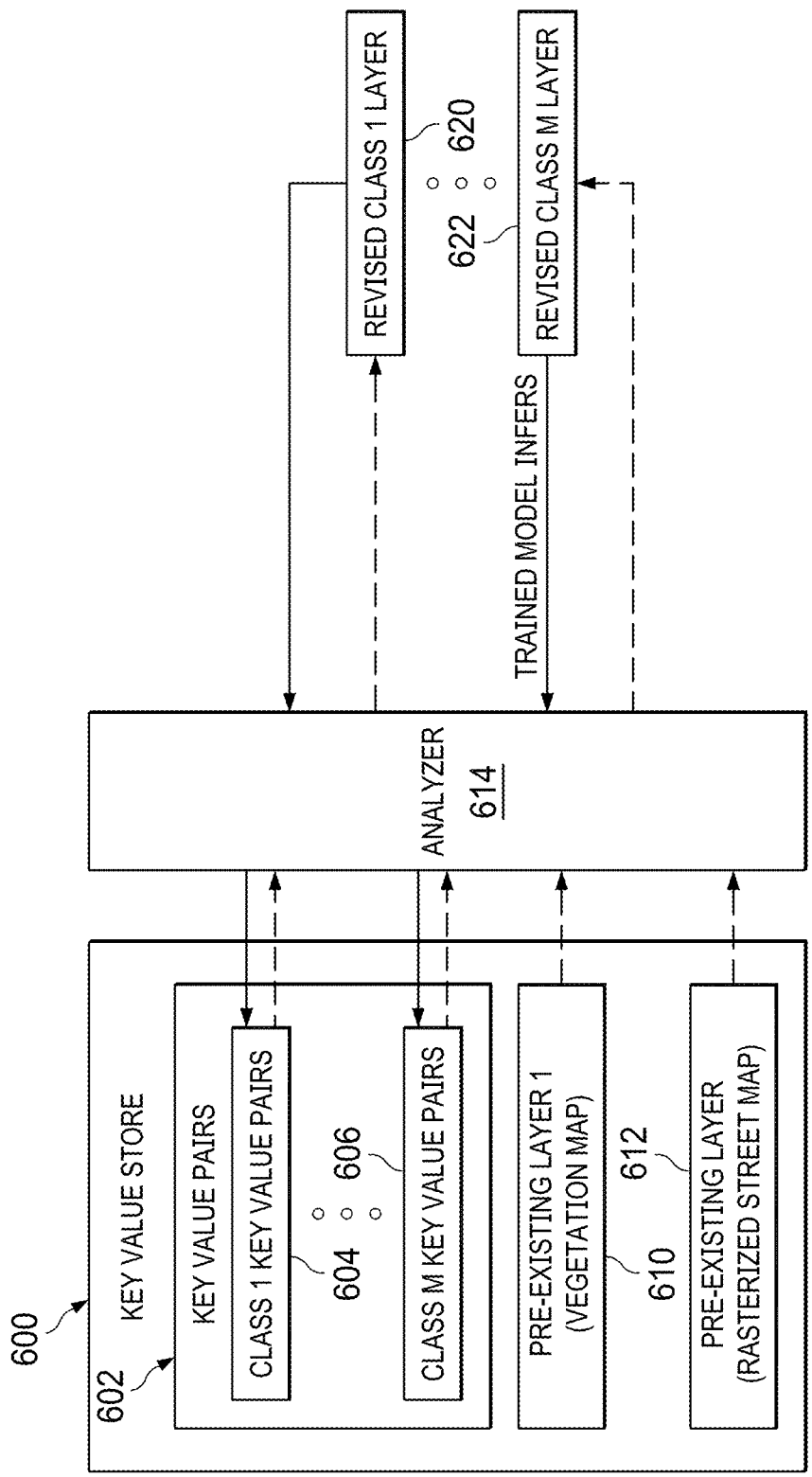
FIG. 6 is a dataflow diagram for updating point cloud data in key value pairs in accordance with an illustrative embodiment.

With reference now to FIG. 6, a dataflow diagram for updating point cloud data in key value pairs is depicted in accordance with an illustrative embodiment. In this illustrative example, key value store 600 stores key value pairs 602 in groups of key value pairs that correspond to 2 classes in this example. As depicted, key value pairs 602 include m sets of key value pairs for m classes from class 1 key value pairs 604 through class m key value pairs 606. Each set of key value pairs corresponds to a class in this example This illustrative example, other types of information can also be stored in key value store 600 in addition to key value pairs 602. As depicted, key value store 600 also stores pre-existing layer 1 (vegetation map) 610 and pre-existing layer 2 (rasterized street map) 612. In this illustrative example, pre-existing layer 1 (vegetation map) 610 can be a hyperspectral satellite map in which vegetation is identified by its greenness. Pre-existing layer 2 (rasterized street map) 612 can be a map in which the pixels represents a classification of roads, buildings or other structures.

As depicted, analyzer 614 can identify classes of information corresponding to classes 1-$m$ from pre-existing layer 1 (vegetation map) 610 and pre-existing layer 2 (rasterized street map) 612. This information can be analyzed with class 1 key value pairs 604 through class m key value pairs 606 to generate revised class 1 layer 620 through revised class m layer 622.

These revised class layers can have enhanced quality as compared to class 1 key value pairs 604 through class m key value pairs 606. For example, if class 1 key value pairs 604 is for vegetation, analyzer 614 can create revised class 1 layer 620 that is improved vegetation layer. Revised class 1 layer 620 can include points where both the satellite image in pre-existing layer 1 (vegetation map) 610 and the point cloud data in class 1 key value pairs 604 indicate the presence of vegetation. In other words, revised class 1 layer 620 will indicate the presence of vegetation for locations in which both of these sources also indicate the presence of vegetation.

In another example, if class m is roadways, the point cloud data generated for class m key value pairs 606 can have high spatial accuracy. However, data can be missing when the Lidar does not penetrate to the ground. As a result, pre-existing layer 2 (rasterized street map) 612 can be used to fill in gaps in the point cloud data represented in class m key value pairs 606 to form revised class m layer 622.

These revised class layers can contain missing data and can be used to update the key value pairs for different classes in key value store 600. The updating of key value pairs for different classes can increase the resolution for one or more classes. In other illustrative examples, these revised class layers can be revised class layers in a rasterized form that can be converted into key value pairs and replace the corresponding class key value pairs.

As a result, increased quality of key value pairs 602 can be created by analyzer 614. Analyzer 614 can be implemented in data manager 212 in FIG. 2. Analyzer 614 can be implemented using a number of different analytic, inference, and model analysis processes. In some illustrative examples, analyzer 614 can be an artificial intelligence system in the form of a machine learning model.

Figure 7:
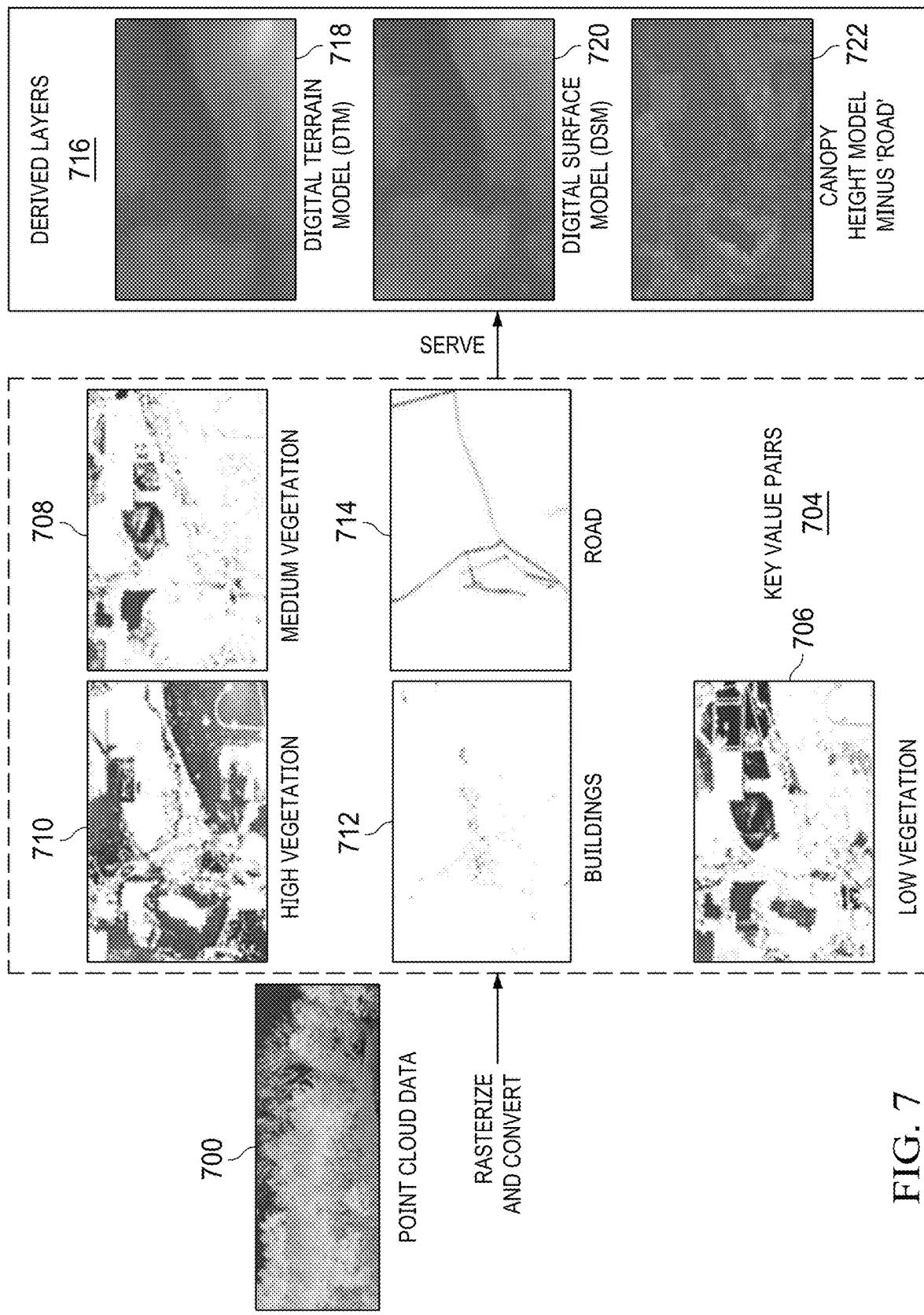
FIG. 7 is an illustration of point cloud data processing in accordance with an illustrative embodiment.

Turning now to FIG. 7, an illustration of point cloud data processing is depicted in accordance with an illustrative embodiment. In this illustrative example, point cloud data 700 comprises data points in which each data point has a longitude, a latitude, and an elevation value. When point cloud data 700 is rasterized into rasterized layers each rasterized layer corresponds to a class and these layers can be converted into key value pairs 704. As depicted, key value pairs 704 comprises low vegetation key value pairs 706, medium vegetation key value pairs 708, high vegetation key value pairs 710, buildings key value pairs 712, and road key value pairs 714.

Key value pairs 704 served to form derived layers 716. Key value pairs 704 can be queried or analyzed in a number different ways. For example, different classes in key value pairs 704 can be analyzed to identify a mean, a maximum, a minimum, or other statistical features. Further, functions such as addition, subtraction, division, multiplication, and other operations can be performed on key value pair 704. These and other functions can be performed on different classes of key value pairs 704 to create different types of models in derived layers 716. In this example, derived layers 716 includes digital terrain model (DTM) 718, digital surface model (DSM) 720, and canopy height model minus road 722.

The illustration of point cloud data processing in FIG. 7 is provided as an example of one implementation and not meant to limit the manner in which other lists of examples can be implemented. For example, in another illustrative example, other classes can be used in addition to or in place of the classes depicted. For example, unclassified, never classified, utility pole, transmission tower, and other types of classes can be used.

Figure 8:
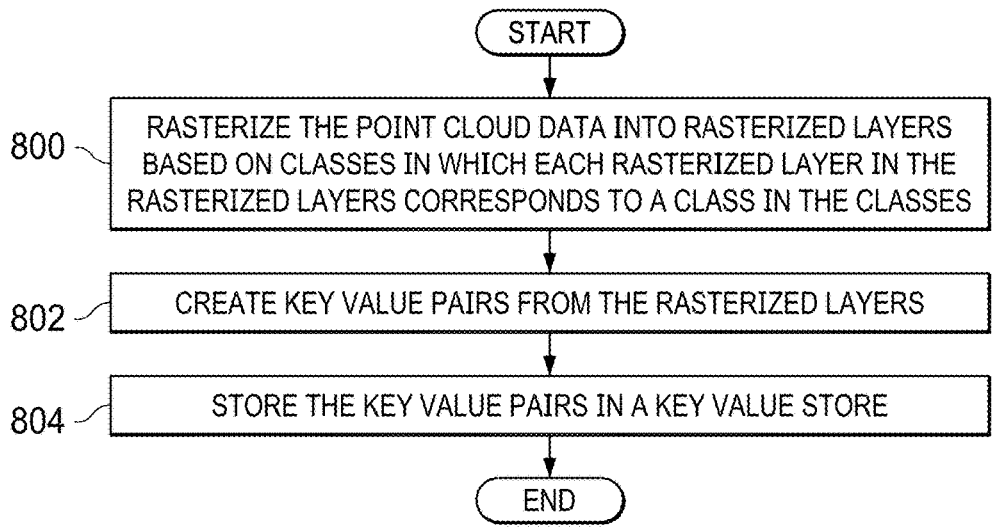
FIG. 8 is a flowchart of a process for rasterizing point cloud data in accordance with an illustrative embodiment.

Turning next to FIG. 8, a flowchart of a process for rasterizing point cloud data is depicted in accordance with an illustrative embodiment. The process in FIG. 8 can be implemented in hardware, software, or both. When implemented in software, the process can take the form of program instructions that are run by one or more processor units located in one or more hardware devices in one or more computer systems. For example, the process can be implemented in data manager 212 in computer system 210 in FIG. 2.

The process begins by rasterizing the point cloud data into rasterized layers based on classes in which each rasterized layer in the rasterized layers corresponds to a class in the classes (step 800). The process creates key value pairs from the rasterized layers (step 802).

The process stores the key value pairs in a key value store (step 804). The process terminates thereafter.

Figure 9:
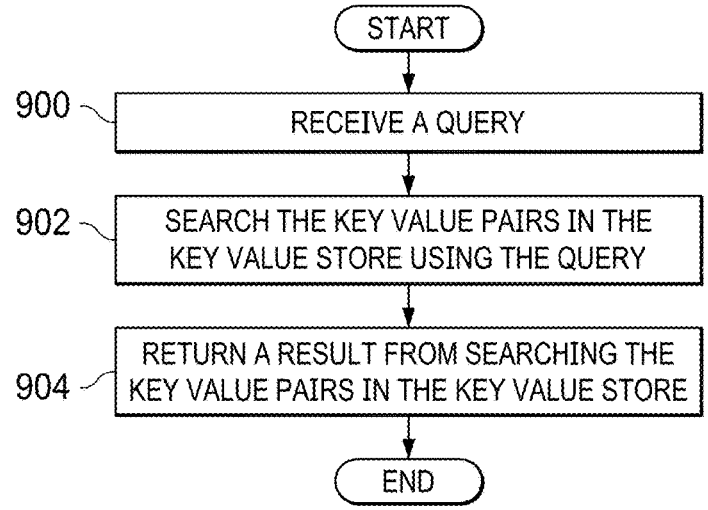
FIG. 9 is a flowchart of a process for searching a key value store in accordance with an illustrative embodiment.

With reference to FIG. 9, a flowchart of a process for searching a key value store is depicted in accordance with an illustrative embodiment. The steps in this flowchart are examples of additional steps that they performed with the process in FIG. 8.

The process receives a query (step 900). The process searches the key value pairs in the key value store using the query (step 902).

The process returns a result from searching the key value pairs in the key value store (step 904). The process terminates thereafter.

Figure 10:
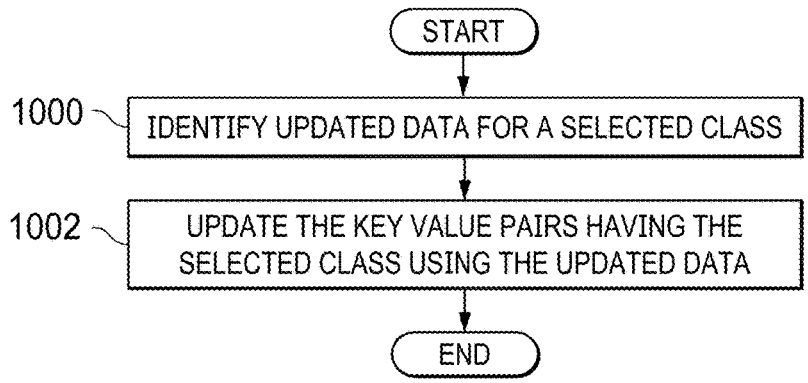
FIG. 10 is a flowchart of a process for updating key value pairs in accordance with an illustrative embodiment.

Turning to FIG. 10, a flowchart of a process for updating key value pairs is depicted in accordance with an illustrative embodiment. The steps in this flowchart are examples of additional steps that they performed with the process in FIG. 8.

The process identifies updated data for a selected class (step 1000). The process updates the key value pairs having the selected class using the updated data (step 1002). The process terminates thereafter.

Figure 11:
FIG. 11 is a flowchart of a process for rasterizing point cloud plan data in accordance with an illustrative embodiment.

In FIG. 11, a flowchart of a process for rasterizing point cloud plan data is depicted in accordance with an illustrative embodiment. The steps in this flowchart are an example of an implementation of step 800 in FIG. 8.

The process identifies a set of files containing the point cloud data (step 1100). The process rasterizes the point cloud data in each file into a set of rasterized layers in the rasterized layers based on the classes for the point cloud data in which each rasterized layer in the rasterized layers corresponds to a class in the classes (step 1102). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 12:
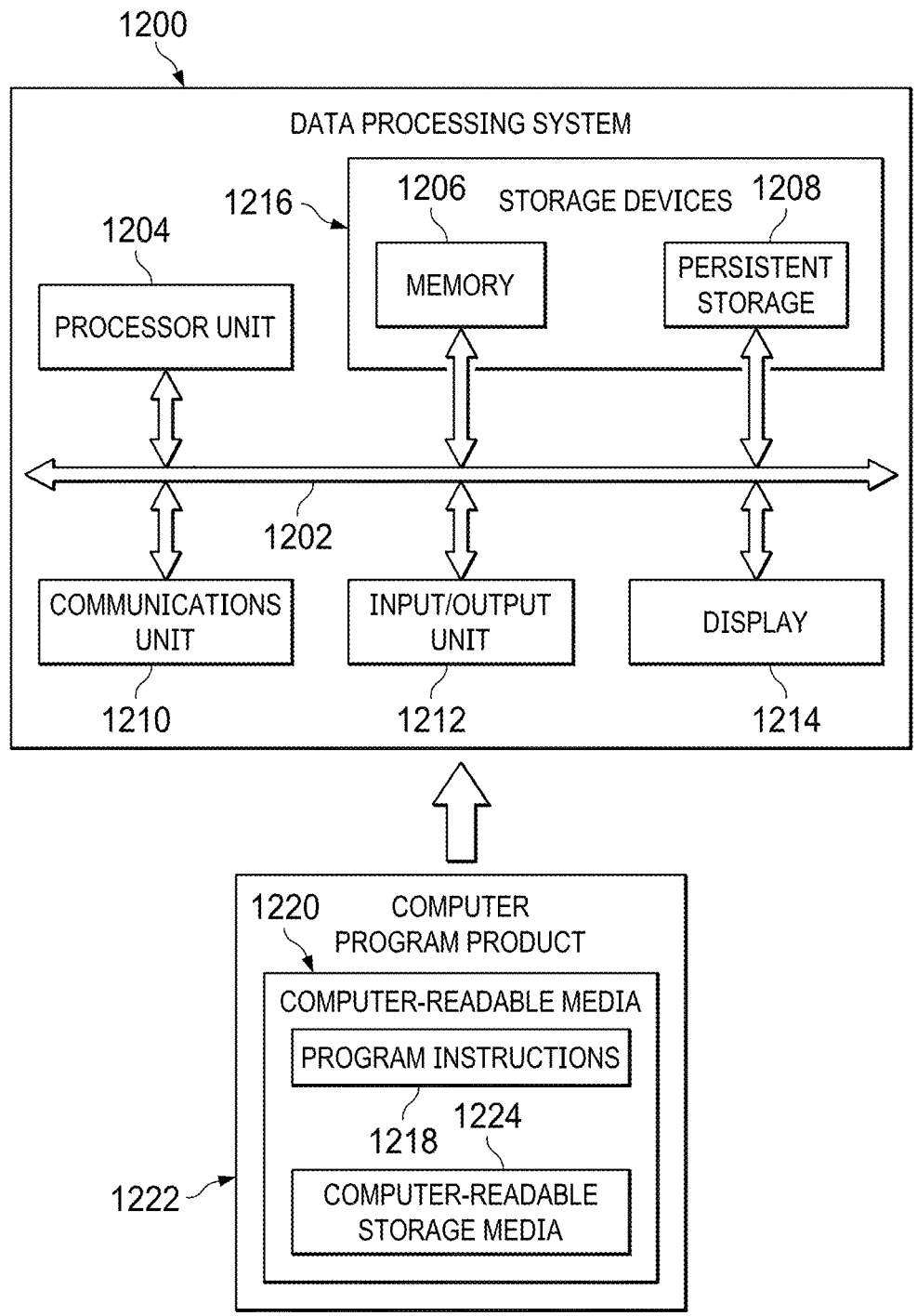
FIG. 12 is a block diagram of a data processing system in accordance with an illustrative embodiment.

Turning now to FIG. 12, a block diagram of a data processing system is depicted in accordance with an illustrative embodiment. Data processing system 1200 can be used to implement server computer 104, server computer 106, client devices 110, in FIG. 1. Data processing system 1200 can also be used to implement computer system 210 in FIG. 2. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1204 can be implemented using one or more heterogeneous processor systems in which a main processor is present with secondary processors on a single chip. As another illustrative example, processor unit 1204 can be a symmetric multi-processor system containing multiple processors of the same type on a single chip.

Memory 1206 and persistent storage 1208 are examples of storage devices 1216. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which may be located in a memory, such as memory 1206.

These instructions are referred to as program instructions, computer usable program instructions, or computer-readable program instructions that can be read and executed by a processor in processor unit 1204. The program instructions in the different embodiments can be embodied on different physical or computer-readable storage media, such as memory 1206 or persistent storage 1208.

Program instructions 1218 is located in a functional form on computer-readable media 1220 that is selectively removable and can be loaded onto or transferred to data processing system 1200 for execution by processor unit 1204. Program instructions 1218 and computer-readable media 1220 form computer program product 1222 in these illustrative examples. In the illustrative example, computer-readable media 1220 is computer-readable storage media 1224.

Computer-readable storage media 1224 is a physical or tangible storage device used to store program instructions 1218 rather than a medium that propagates or transmits program instructions 1218. Computer readable storage media 1224, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1218 can be transferred to data processing system 1200 using a computer-readable signal media. The computer-readable signal media are signals and can be, for example, a propagated data signal containing program instructions 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1220" can be singular or plural. For example, program instructions 1218 can be located in computer-readable media 1220 in the form of a single storage device or system. In another example, program instructions 1218 can be located in computer-readable media 1220 that is distributed in multiple data processing systems. In other words, some instructions in program instructions 1218 can be located in one data processing system while other instructions in program instructions 1218 can be located in one data processing system. For example, a portion of program instructions 1218 can be located in computer-readable media 1220 in a server computer while another portion of program instructions 1218 can be located in computer-readable media 1220 located in a set of client computers.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, may be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program instructions 1218.

Thus, illustrative embodiments provide a computer implemented method, computer system, and computer program product for rasterizing point cloud data. One more illustrative examples can rasterize point cloud data based on the class of the data points to generate rasterized layers in which each layer corresponds to a class. The rasterized layers can be matrices with indices that represent longitude and latitude the data points with a pixel value that can represent a height of the point in response to the point cloud data being generated using a lidar laser system. These rasterized layers can then be converted into key value pairs.

In creating key value pairs, empty portions of the rasterized layers are not converted into key value pairs in the illustrative examples, resulting in a reduction of the amount of data that is stored. Further, the use of key value pairs also enables searching and analysis of the point cloud data represented by the key value pairs. As a result, new layers or models can be created from the key value pairs through at least one of querying or analyzing the point cloud data represented in the key value pairs.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for rasterizing point cloud data, the computer implemented method comprising:
   rasterizing, by a number of processor units, the point cloud data into rasterized layers based on classes in which each rasterized layer in the rasterized layers corresponds to a class in the classes, wherein a rasterized layer in the rasterized layers comprises a matrix in which longitudes and latitudes are indices and heights are values;
   creating, by the number of processor units, key value pairs from the rasterized layers; and
   storing, by the number of processor units, the key value pairs in a key value store.

2. The computer implemented method of claim 1 further comprising:
   receiving, by the number of processor units, a query;
   searching, by the number of processor units, the key value pairs in the key value store using the query; and
   returning, by the number of processor units, a result from searching the key value pairs in the key value store.

3. The computer implemented method of claim 1 further comprising:
   identifying, by the number of processor units, updated data for a selected class; and
   updating, by the number of processor units, the key value pairs having the selected class using the updated data.

4. The computer implemented method of claim 1, wherein rasterizing, by the number of processor units, the point cloud data into the rasterized layers based on the classes for the point cloud data in which each rasterized layer in the rasterized layers corresponds to the class in the classes comprising:
   identifying, by the number of processor units, a set of files containing the point cloud data; and
   rasterizing, by the number of processor units, the point cloud data in each file into a set of rasterized layers in the rasterized layers based on the classes for the point cloud data in which each rasterized layer in the rasterized layers corresponds to the class in the classes.

5. The computer implemented method of claim 1, wherein a key in a key value pair is selected from a group comprising a longitude and a latitude and the longitude, the latitude, and a class identifier.

6. The computer implemented method of claim 1, wherein a value in the key value pair is selected from at least one of a height, a temperature, a surface moisture, or a reflectivity value.

7. A computer system comprising:
   a number of processor units, wherein the number of processor units executes program instructions to:
     rasterize point cloud data into rasterized layers based on classes in which each rasterized layer in the rasterized layers corresponds to a class in the classes, wherein a rasterized layer in the rasterized layers comprises a matrix in which longitudes and latitudes are indices and heights are values;
     create key value pairs from the rasterized layers; and
     store the key value pairs in a key value store.

8. The computer system of claim 7, wherein the number of processor units executes the program instructions to:
   receive a query;
   search the key value pairs in the key value store using the query; and
   return a result from searching the key value pairs in the key value store.

9. The computer system of claim 7, wherein the number of processor units executes the program instructions to:
   identify updated data for a selected class; and
   update the key value pairs having the selected class using the updated data.

10. The computer system of claim 7, wherein in rasterizing the point cloud data into the rasterized layers based on the classes for the point cloud data in which each rasterized layer in the rasterized layers corresponds to the class in the classes, the number of processor units executes the program instructions to:
    identifying a set of files containing the point cloud data; and
    rasterize the point cloud data in each file into a set of rasterized layers in the rasterized layers based on the classes for the point cloud data in which each rasterized layer in the rasterized layers corresponds to the class in the classes.

11. The computer system of claim 7, wherein a key in a key value pair is selected from a group comprising a longitude and a latitude and the longitude, the latitude, and a class identifier.

12. The computer system of claim 7, wherein a value in the key value pair is selected from at least one of a height, a temperature, a surface moisture, or a reflectivity value.

13. A computer program product for rasterizing point cloud data, the computer program product comprising:
   a computer readable storage medium having program instructions embodied therewith, the program instructions executable by a computer system to cause the computer system to perform a method of:

rasterizing, by a number of processor units, the point cloud data into rasterized layers based on classes in which each rasterized layer in the rasterized layers corresponds to a class in the classes, wherein a rasterized layer in the rasterized layers comprises a matrix in which longitudes and latitudes are indices and heights are values;

creating, by the number of processor units, key value pairs from the rasterized layers; and storing, by the number of processor units, the key value pairs in a key value store.

14. The computer program product of claim 13 further comprising:

receiving, by the number of processor units, a query;

searching, by the number of processor units, the key value pairs in the key value store using the query; and returning, by the number of processor units, a result from searching the key value pairs in the key value store.

15. The computer program product of claim 13 further comprising:

identifying, by the number of processor units, updated data for a selected class; and updating, by the number of processor units, the key value pairs having the selected class using the updated data.

16. The computer program product of claim 13, wherein rasterizing, by the number of processor units, the point cloud data into the rasterized layers based on the classes for the point cloud data in which each rasterized layer in the rasterized layers corresponds to the class in the classes comprising:

identifying, by the number of processor units, a set of files containing the point cloud data; and rasterizing, by the number of processor units, the point cloud data in each file into a set of rasterized layers in the rasterized layers based on the classes for the point cloud data in which each rasterized layer in the rasterized layers corresponds to the class in the classes.

17. The computer program product of claim 13, wherein a key in a key value pair is selected from a group comprising a longitude and a latitude and the longitude, the latitude, and a class identifier.

\* \* \* \* \*